United States Patent [19]
Goldman et al.

[11] Patent Number: 5,844,969
[45] Date of Patent: Dec. 1, 1998

[54] COMMUNICATION SYSTEM, METHOD AND DEVICE FOR REMOTELY RE-TRANSMITTING RECEIVED ELECTRONIC MAIL DIRECTED TO A DESTINATION TERMINAL TO A NEW DESTINATION TERMINAL

[75] Inventors: Shelley B. Goldman, East Brunswick; David Phillip Silverman, Somerville; Robert S. Westrich, Middletown, all of N.J.

[73] Assignee: AT&T Corp., Middletown, N.J.

[21] Appl. No.: 787,420

[22] Filed: Jan. 23, 1997

[51] Int. Cl.$^6$ .................................................. H04M 11/00
[52] U.S. Cl. .................... 379/93.24; 455/412; 395/200.3
[58] Field of Search .............................. 379/90.01, 93.01, 379/93.07, 93.14, 93.15, 93.17–93.21, 93.23, 93.24, 100.08; 358/402, 407; 455/32.1, 412, 556, 557, 566; 340/311.1, 825.07, 825.15–825.17, 825.44; 395/200.13, 200.36, 673, 54, 680

[56] References Cited

U.S. PATENT DOCUMENTS

| | | | |
|---|---|---|---|
| 4,951,044 | 8/1990 | Nelson et al. | 455/32.1 |
| 5,293,250 | 3/1994 | Okumura et al. | 358/402 |
| 5,377,354 | 12/1994 | Scannell et al. | 395/673 |
| 5,487,100 | 1/1996 | Kane | 379/93.24 |
| 5,557,723 | 9/1996 | Holt et al. | 358/402 |
| 5,561,703 | 10/1996 | Arledge et al. | 455/32.1 |
| 5,604,788 | 2/1997 | Tett | 379/93.24 |
| 5,632,018 | 5/1997 | Otorii | 395/200.03 |

OTHER PUBLICATIONS

Paul Hurly et al, *The Videotex and Teletext Handbook*, pp. 216–218 & 388, © 1985.

*Primary Examiner*—Wing F. Chan

[57] ABSTRACT

A communication system for remotely re-selecting and re-transmitting received electronic mail at a destination terminal to another destination terminal using a remote communication device, e.g., a two-way pager. The system includes an electronic mail server coupled to an electronic mail network, a backbone and an alert network. The electronic mail server receives electronic mail messages from the electronic mail network or from the backbone network. Each received mail message includes a sender identification, an E-mail identification and a destination terminal. The server generates and transmits over the alert network a select signal and a message summary to the communication device when an E-mail has been received from a destination terminal. A communication device stores the message summaries and displays them as a user scrolls the message summaries. The user through a keyboard in the device may select and revise a message summary by entering a new destination in the message summary. Using a send key, the user transmits the revised message summary to the server coupled to the destination terminal. The server in response to the transmitted revised message summary accesses a database to locate a copy of the received message or contacts and instructs the destination terminal to forward a copy of the received message to the new destination terminal via the server or an alternate server.

39 Claims, 5 Drawing Sheets

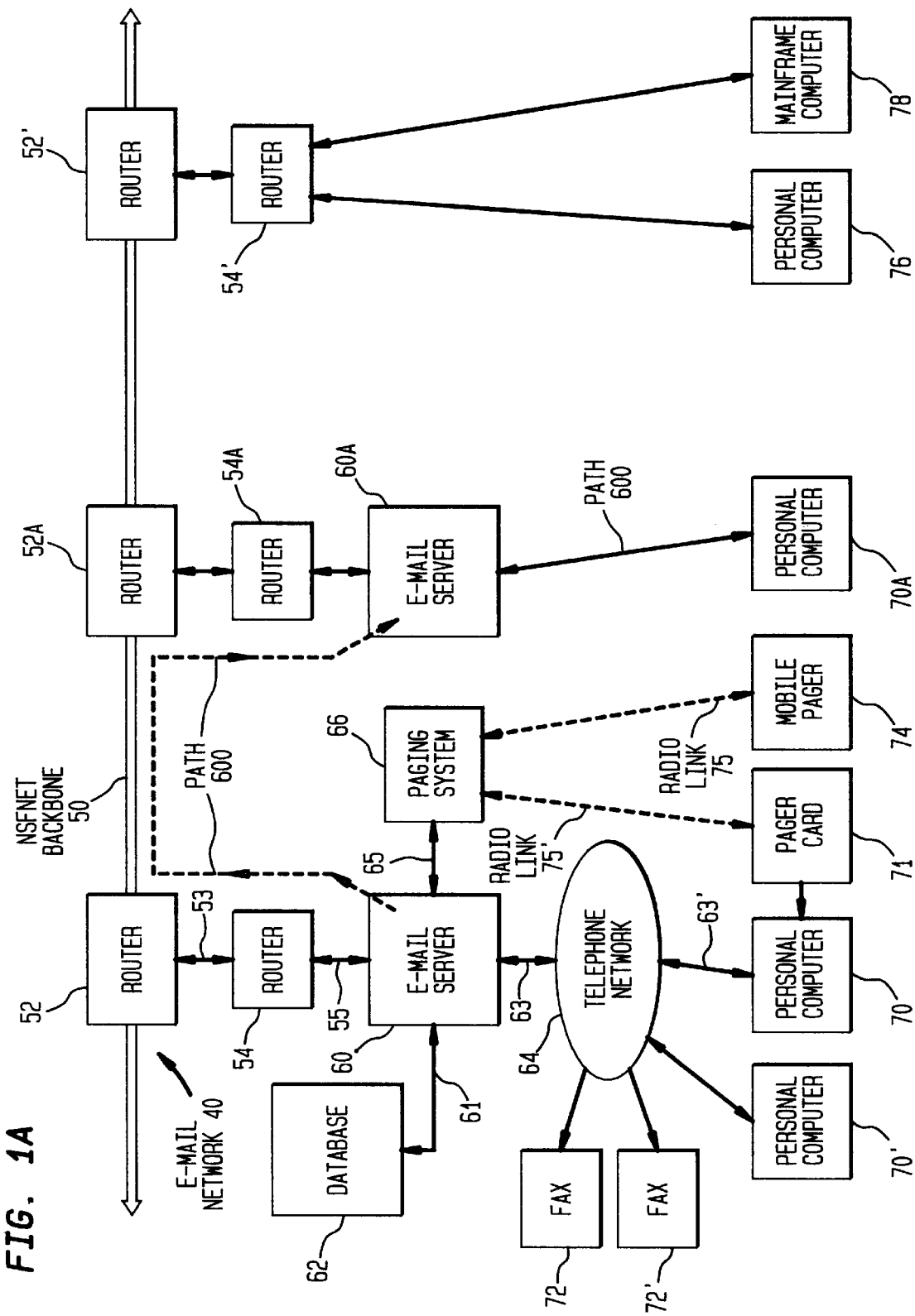

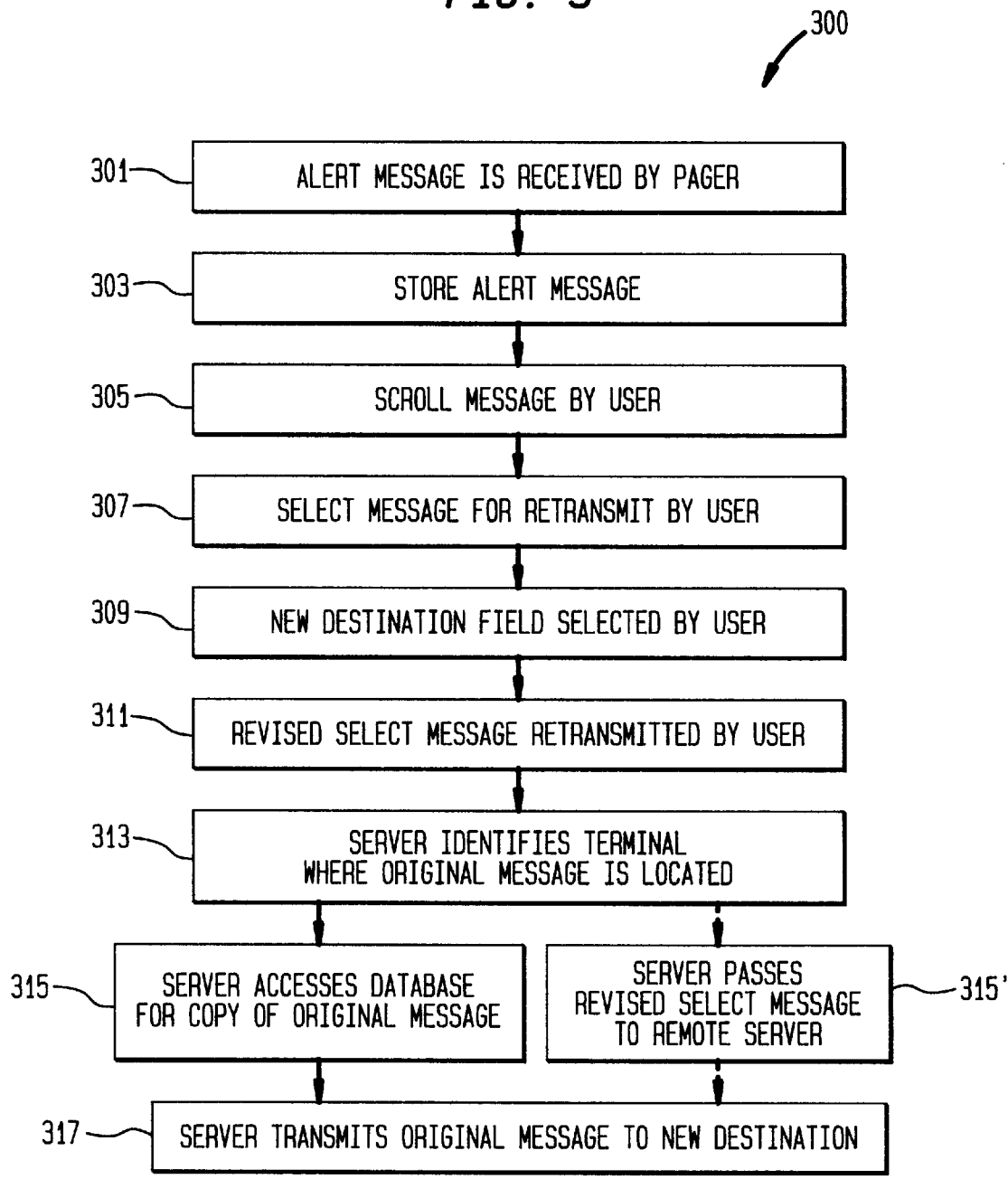

COMMUNICATION SYSTEM, METHOD AND DEVICE FOR REMOTELY RE-TRANSMITTING RECEIVED ELECTRONIC MAIL DIRECTED TO A DESTINATION TERMINAL TO A NEW DESTINATION TERMINAL

CROSS-REFERENCES TO RELATED APPLICATIONS

This application is related to the following co-pending patent applications, assigned to the assignee of the present invention and incorporated herein by reference:

(1) "An E-Mail Paging System" by Foldare et al., Ser. No. 08/720,128, filed Sep. 27, 1996 discloses a communication system in which electronic mail at a server in a first network can be directed to a selected destination by a user at a remote terminal in a second network.

(2) "An Intelligent Pager for Remotely Managing E-Mail Messages" by Foldare et al., Ser. No. 08/720,127, filed Sep. 27, 1996 discloses a communication system in which electronic mail at a server in a first network is automatically managed and directed to a destination terminal by a remote terminal in a second network.

BACKGROUND OF THE INVENTION

1. Field of the Invention

This invention relates to communication systems, devices and methods of operation. More particularly, the invention relates to a communication system for re-transmitting received electronic mail directed to a first destination terminal to a new destination terminal coupled to the same or a different server using a remote communication device operated by a user.

2. Background Discussion

The referenced applications disclose remote terminal devices, e.g. two-way pagers which enable a user to select and/or automatically manage where electronic mail in a network is to be received at a destination terminal. As users move from place to place in the conduct of business or in a travel status there is a need to improve such referenced two-way pagers to enable a user to re-select and re-transmit electronic mail directed to a selected destination to another destination coupled to the same or a different server. Communication systems and remote terminal devices, such as two-way paging systems, with re-select and re-transmit capability for received electronic mail directed to a destination terminal will further improve the conduct of business and the personal affairs of users of such systems and devices.

SUMMARY OF THE INVENTION

A communication system, device and method are disclosed for re-selecting and re-transmitting electronic mail directed to a selected destination terminal in a network to another destination terminal in the same or a different network by a user at a remote terminal, such as two-way paging device. In the system, an electronic mail server is coupled to an electronic mail network and an alert network. The server contains a processor for initiating an alert signal to a user on the alert network when electronic mail has been received at the server for a selected user destination terminal. The alert signal contains a message summary of the received mail which may be stored at the server or at the selected destination terminal. The summary includes a sender identification; an electronic mail or message title; an electronic mail identification, and the selected user destination terminal to which the electronic mail was directed. Such alert messages are received and stored by the user in a communication device, e.g., a two-way pager coupled to the alert network. The stored alert messages are displayed by the communication device which provides the user with a scroll and/or select function(s) to re-select and re-transmit the received electronic mail directed to the selected user destination terminal to a new destination terminal and/or user served by the same or a different server. When the user chooses a displayed message summary for re-selection and re-transmission, a new destination field is completed by the user through a keyboard and entered in the display of the device. After the new destination address is entered in the new destination field, the user transmits over the alert network to the server a revised message summary containing the new electronic mail forwarding address signal for the received mail at the user destination terminal. Alternatively, the user may transit the new destination to the server by wireline or wireless connection. The server responds to the revised message summary containing the new forwarding address by locating in a database a copy of the received message and forwarding to the new destination. Alternatively, if a copy is not available in the database the server contacts and instructs the user's first or selected destination terminal to forward a copy of the received message to the server or another server in the same or a different network which re-transits the copy to the new destination terminal at the forwarding address selected by the user.

DESCRIPTION OF THE DRAWING

FIG. 1A is a block diagram of FIG. 1 including an E-mail path between a server and a destination terminal.

FIG. 3 is a flow diagram implementing the operation of the system of FIG. 1 and the device in FIGS. 2A and B.

DESCRIPTION OF PREFERRED EMBODIMENT

Figure 1:
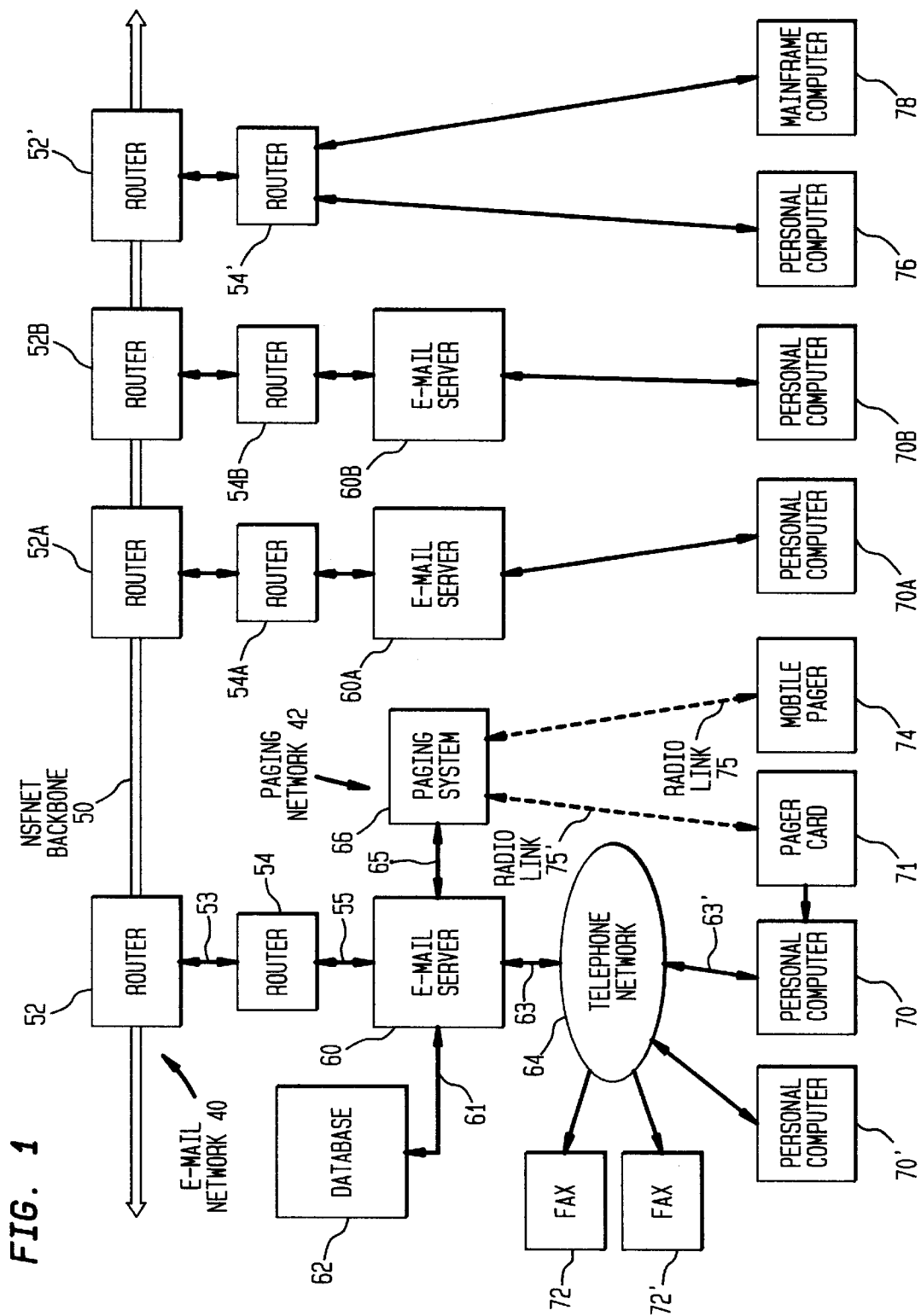
FIG. 1 is a block diagram of a communication system including an electronic or E-mail server coupled to an E-mail network, a telephone network and a communication device through an alert or paging system, the system incorporating the principles of the present invention.

FIG. 1 discloses an E-mail network 40, a paging network 42 and a telephone network 64 connected to an E-mail server 60. An E-mail message entitled, e.g., "Meeting Notice" (not shown), is prepared by a sender at a personal computer 76 or a mainframe computer 78 and addressed to a "Recipient A". The message is sent to the E-mail network 40 which includes a router 54', a router 52' and a backbone network such as the National Science Foundation Network (NSFNET). The E-mail message has a network routing address, for example, a domain-based address "Recipient A @ Company C.com". The Network 40 appends to the E-mail message a unique E-Mail message ID such as a string "SS Smith-76-0930-091296" consisting of the senders ID, the sender's node ID, the time of day and the date. The E-mail network 40 routes the E-mail message over the backbone network 50, a router 52, router 54, path 55 to the E-mail server 60 coupled to a selected destination terminal 70 through the network 64. FIG. 1 also shows first and second alternate destination terminals 70A, 70B connected by E-mail servers 60A, 60B through routers 54A, 54B and routers 52A, 52B, respectively to backbone network 50.

As described in the cross-referenced related applications cited above and incorporated herein by reference, the server 60 generates and transmits over the alert network 66 to a paging device 74 a select signal containing a message summary when electronic mail is received at the server for a selected user destination terminal, e.g. terminal 70. Alternatively, the server 60 may receive a message summary from a remote server 60A coupled to the originating terminal 76 through the backbone network 50.

Figure 2A:
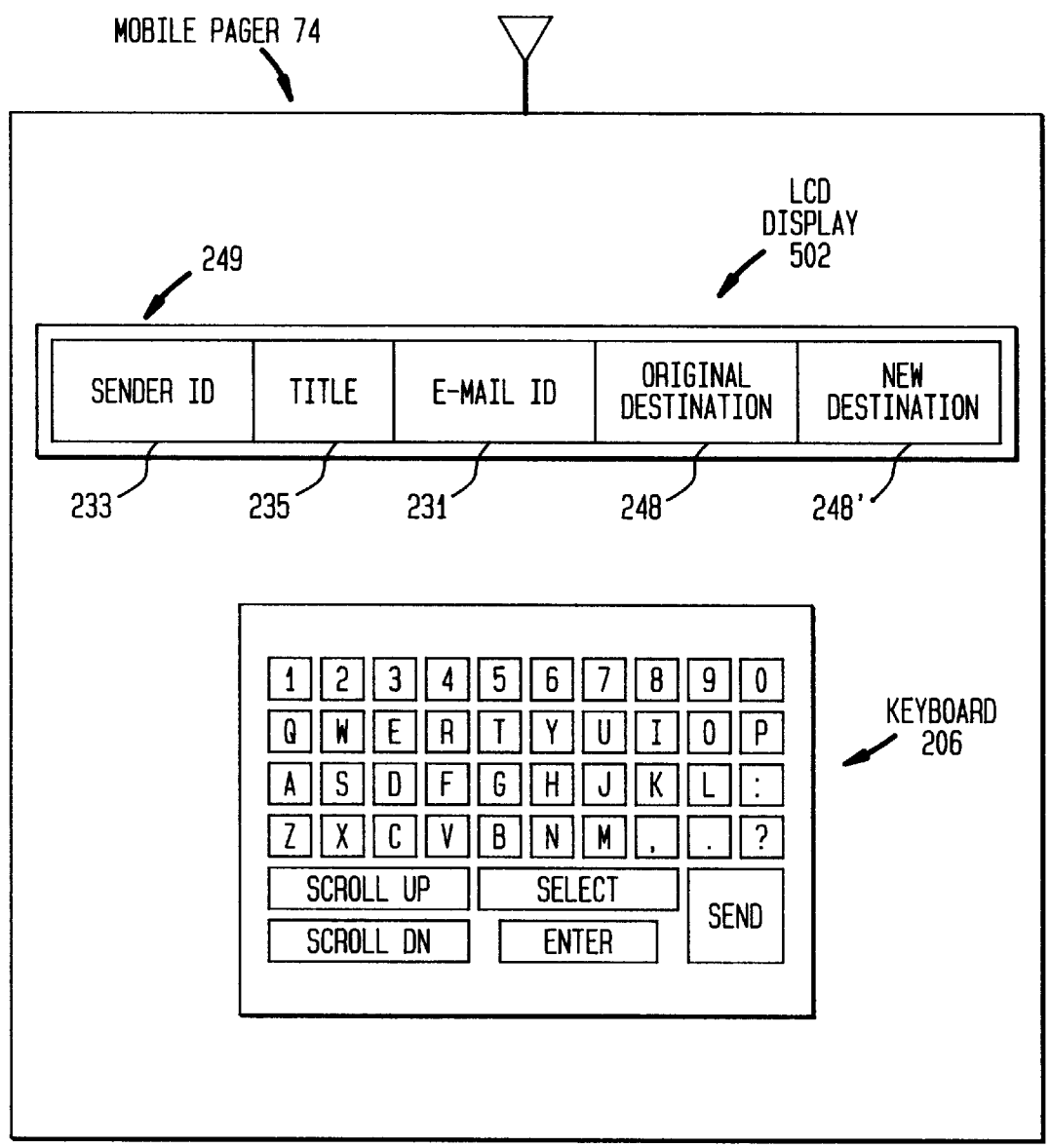
FIG. 2A is a block diagram of the communication device included in FIG. 1 and displaying E-mail message summary for mail received by a user at an original destination terminal for re-selection and re-transmission by the user to another destination terminal.

An example of a select signal 249 transmitted to and appearing in the paging device 74 is shown in FIG. 2A. The select signal is presented in an LCD display 502 which includes areas for a sender ID 233; a message title 235, an E-mail identification 231, and an original destination 248. The items 233, 235 and 231 comprise the select signal 249. The display 502 also includes a field 248' for entering a new destination for the message directed to the original destination. A keypad 206 installed in the device 74 is operated by the user to enter information in the destination field 248'. The information in field 248' is used to instruct the server 60 or a remote server 60A to re-select and re-transmit the received information directed to the original destination to the new destination, as will be described hereinafter.

Figure 2B:
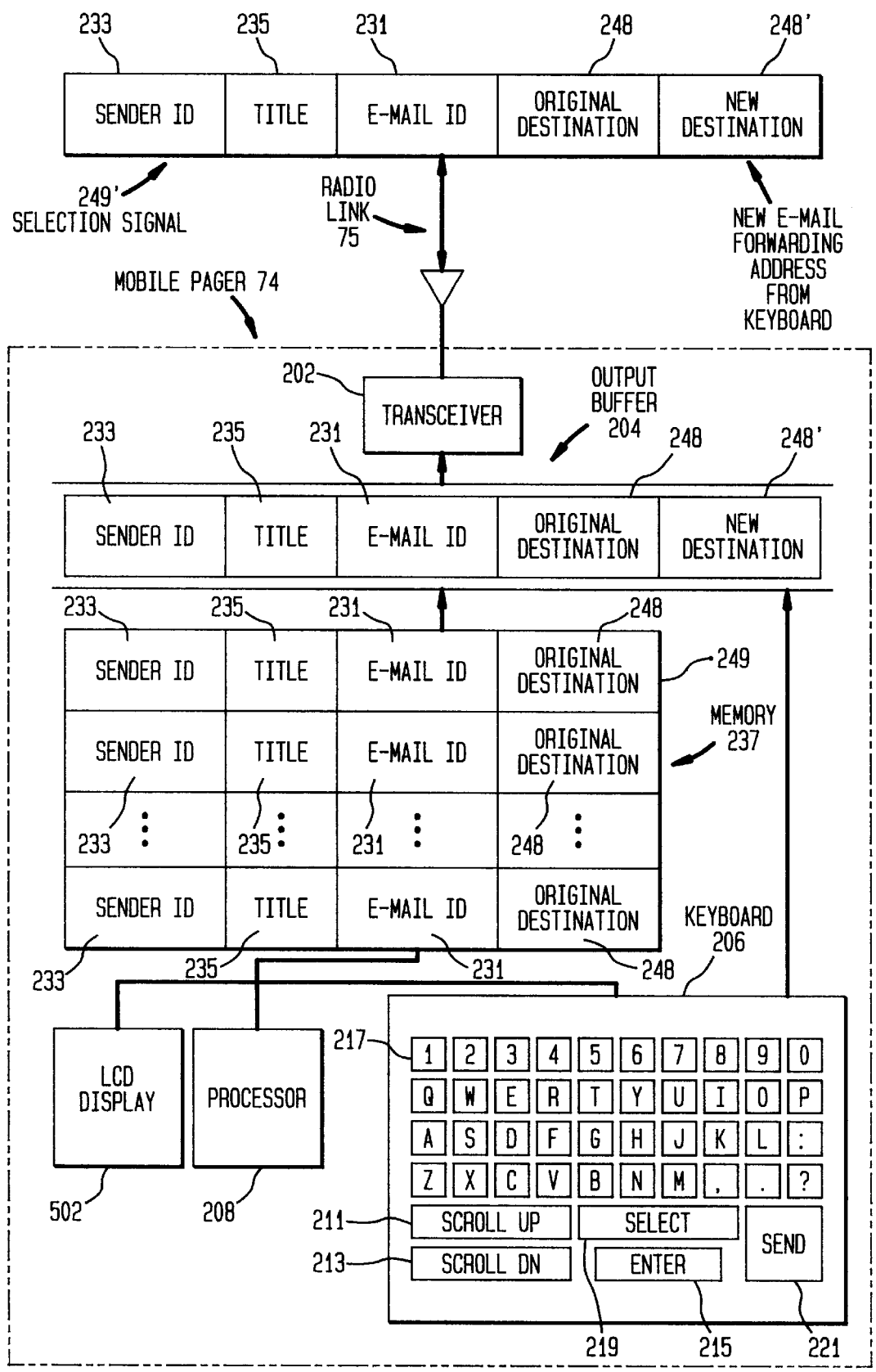
FIG. 2B is a block diagram of the circuit elements contained in the communication device of FIG. 2A.

In FIG. 2B, the pager includes a transceiver 202 for receiving the select signals or message summaries 249 over a radio link 75. The message summaries 249 are stored in a memory 237 and provided to the display 502 and a processor 208. The keyboard 206 includes scroll keys 211 and 213, which when operated by a user, successively display the stored select message summaries 249 in the pager. A select key 215 enters a selected signal 249 in the display 502 when operated by a user after the selected signal 249 has been scrolled to the display area 502.

To change the original selected destination (for example terminal 70 in FIG. 1A) of the selected E-mail message, the user operates a keypad 217 and an enter key 219 to input the processor 208 with the new destination (for example terminal 70A). After a destination has been entered into the field 248', a send key 221 is operated by the user to transmit to the server 60 through the transceiver a revised selection signal 249' contained in the output buffer 204. The revised select signal 249' contains the new forwarding address 248' of the received E-mail message directed to the original destination 70 for re-transmission to a new destination terminal 70A. The signal 249' is sent to the server 60 through the paging or alert network 42, and the E-mail network 40. Alternatively, in lieu of the alert network, the signal 249' may be sent to the server by other communication means, e.g. wireline, wireless, etc. connection. Upon receiving the signal 249', the server may locate a copy of the received message in a database 62 and forward to the new destination terminal or the server may use the E-mail message ID 231 or a time stamp or serial number in the revised message summary 249' to locate the user's original destination terminal 70 containing the received E-mail message. In such case, the server 60 instructs the original destination terminal 70 to send a copy of the selected received E-mail message defined by the E-mail identification number 231 to the first alternate server 60A over path 600. Upon receipt of the selected received E-mail message, the first alternate server 60A re-transmits the selected received E-mail message to the new destination terminal 70A at the new forwarding address contained in the select signal 249'. The re-transmitted E-mail message may be sent by E-mail or fax according to the communication facilities installed at the new destination terminal 70A and in accordance with the principles of the cross-referenced related applications, cited above, which are fully incorporated herein by reference. In a similar manner to that described for terminal 70A, the user may direct the message for terminal 70 to be directed to terminal 70B through server 60B, shown in FIG. 1.

In FIG. 3, a process 300 will now be described in conjunction with FIG. 2B for a user using a paging device 74 to re-select and re-transmit a received E-mail message at a destination terminal 70 to a new destination terminal 70A as specified in a revised message summary 249' sent to the server 60. The process is entered in step 301 in which a select message summary 249 is received by the pager 74 in accordance with the process described in the cross referenced application.

In step 303, the select message summaries 249 are stored in a memory 237 contained in the paging device. The number of stored messages summaries is only limited by the capacity of the memory 237 and may be for a period of time or a selected quantity of messages, in the event memory capacity is limited. In step 305 a user scrolls the stored message summaries using the scroll keys 211/213 to determine whether received messages directed to a selected destination terminal should be re-transmitted. As each message summary is scrolled, the related information appears in areas or fields of the display 502 in the paging device. In a step 307, the user proceeds to select a message summary in the memory 237 for re-transmission to the server 60 by operating a select button 215 in the keypad 217. In a step 309, the user operates the keypad 217 to enter the processor 208 and provide a new forwarding address in the new destination field 248' of the output buffer 204. None of the other fields in the display may be altered by the user, since the keyboard and processor are only connected to the output buffer. Alternatively, the user may not provide a new destination in field 248', but re-transmit the message summary 249 back to the server. In such case, the server is programmed to check the database e.g. database 62 for an alternative designation to be used in such case. Afterwards, the server triggers the transmission of the message to the alternative destination specified in the database.

In a step 311, the user operates a send key pad 221 to re-transmit the selected revised message summary 249' to the server. As indicated previously, the revised message summary may be sent to the server by wireline or wireless connection. In a step 313, the server 60 identifies the destination terminal 70 to which the original message was directed. In the event the server 60 is not coupled to the selected destination terminal, e.g. terminal 70A the revised message summary 249' is passed by the receiving server 60 to a remote server, e.g. remote server 60A coupled to the destination terminal 70A. In a step 315, the server 60 receives the revised select message summary 249' and accesses a database 62 or contacts the terminal 70 to locate a copy of the received E-mail message at the original destination terminal by using the message identification 231. Alternatively, in a step 315', the server 60 passes the revised select message 249' to the original destination server 60A which contacts the destination terminal 70A and obtains a copy of the re-selected received E-mail If the destination terminal is off-line, the server sends a wake up signal to activate the terminal which sends a copy of the identified E-mail message to the server, as described in the cross-referenced related applications, cited above.

In a step 317, the server stores or re-transmits the re-selected message (corresponding to the revised message summary 249') to the new destination terminal. Server 60 transits a new select message 249 to the pager 74 designating new terminal 70A as the destination for the E-mail message, after which the process ends.

While the invention has been described in a specific embodiment, various changes may be made in the system, device and method without departing from the spirit and scope of the present invention, as defined in the appended claims, in which:

We claim:

1. An article of manufacture, comprising:
   a computer usable medium having computer readable program means embodied therein for remotely re-transmitting received electronic mail at an original destination terminal to a new destination using a communication device, the computer readable program code means in said article of manufacture comprised of:
   a) computer readable code means for receiving message summaries indicative of electronic mail messages received at an original destination terminal; each received message summary including a sender identification, an E-mail identification and a destination terminal;
   b) computer readable program code means for generating and transmitting over the alert network a select signal and accompanying message summary;
   c) computer readable program code means for storing in the communication device and revising the message summary to include a new destination for re-transmitting the received message at the original destination terminal to the new destination terminal; and
   d) computer readable program code means for locating a and forwarding a copy of the received message at the original destination to the new destination terminal.

2. In a communication system in which an electronic message for a user is transmitted over a data network and received at an original electronic destination, a method comprising the steps of:
   a) receiving a signal indicating a new electronic destination to which the received electronic message is to be re-transmitted;
   b) identifying a location and retrieving the electronic message stored at the location; and
   c) triggering the transmission of the electronic message transmitted to the original electronic destination to the new electronic destination.

3. The method of claim 2 further comprising the steps of:
   a) transmitting the electronic message cooperatively with an alert signal being transmitted over an alert network to a communication device associated with the user to alert the user of the electronic message; and
   b) transmitting a signal to the communication device indicating the electronic message has been delivered to the original electronic destination.

4. The method of claim 2 further comprising the step of:
   a) using a two-way communication device to transmit the signal indicating the new electronic destination to which the electronic message is to be re-transmitted.

5. The method of claim 4 in which the electronic message is retrieved from a terminal or a server.

6. The method of claim 5 in which the electronic message is retrieved from a database associated with the server.

7. In a communication system including an electronic mail server coupled to an electronic mail network and an alert network, a method for remotely re-transmitting received electronic mail at an original destination terminal to a new destination using a communication device, comprising the steps of:
   a) receiving message summaries indicative of electronic mail messages received at an original destination terminal; each received message summary including a sender identification, an E-mail identification and a destination terminal;
   b) generating in a server and transmitting over the alert network to the communication device a select signal and accompanying message summary;
   c) identifying a location and retrieving the electronic message stored at the location; and
   d) triggering the re-transmission of the received message to the new destination terminal.

8. The method of claim 7 further comprising the steps of:
   a) revising the message summary to include a new destination for re-transmitting the received message at the original destination terminal to the new destination terminal.

9. The method of claim 7 further comprising the steps of:
   a) receiving a non-revised message summary;
   b) checking a database; and
   c) forwarding the non-revised message to a new destination specified in the database.

10. The method of claim 7 further comprising the step of locating in the electronic mail network a copy of the received message at the original destination corresponding to the revised message summary for re-transmission to the new destination terminal.

11. The method of claim 7 further including the step of inputting the new destination to the communication device by a user.

12. The method of claim 7 further including the step of storing the message summaries in a memory.

13. The method of claim 7 further including displaying a message summary in a display.

14. The method of claim 7 further including the step of scrolling in the display, the message summaries stored in the memory.

15. The method of claim 7 further including the step of selecting a displayed message summary for re-transmission to a server.

16. The method of claim 7 further including the step of entering a new destination in the selected message summary.

17. The method of claim 7 further including the step of forming a revised message summary in an output buffer with a new destination for transmission to the server.

18. The method of claim 7 further including the step of transmitting the revised message summary to the server.

19. The method of claim 7 further including the steps of receiving and transmitting message summaries between a remote server and the communication device, selected message summaries revised to identify the original destination terminal and a new destination terminal.

20. A communication system in which an electronic message for a user is transmitted over a data network and received at an electronic destination, comprising:
   a) means for receiving a signal indicating a new electronic destination to which the received electronic message is to be re-transmitted;
   b) identifying a location and retrieving the electronic message stored at the location; and
   c) means for triggering the transmission of the electronic message transmitted to the original electronic destination to the new electronic destination.

21. The system of claim 20 further comprising:
a) means for transmitting the electronic message cooperatively with an alert signal being transmitted over an alert network to a communication device associated with the user to alert the user of the electronic message; and
b) means for transmitting a signal to the communication device indicating the electronic message has been delivered to the original electronic destination.

22. The system of claim 20 further comprising:
a) a two-way communication device for transmitting the signal indicating the new electronic destination to which the electronic message is to be re-transmitted.

23. The system of claim 20 wherein the electronic message is retrieved from a database associated with the server.

24. The system of claim 20 wherein the electronic message is retrieved from a terminal or a server.

25. A communication system for remotely re-transmitting a received message at an original destination terminal to a new destination terminal by a user using a communication device, comprising:
a) an electronic mail server coupled to an electronic mail network and an alert network; the electronic mail server generating a message summary indicative of an electronic mail message received at the original destination terminal; the message summary including a sender identification and a destination terminal;
b) means for transmitting over the alert network to the communication device a select signal including the message summary;
c) means included in the communication device for storing the message summary and re-transmitting a revised message summary to the electronic mail server, the revised message summary containing a new destination for the electronic mail message received at the original destination terminal, said new destination inputted to the communication device by a user; and
d) means for identifying a location and retrieving the electronic message stored at the location; and
e) means responsive to the revised message summary for re-transmitting the electronic mail message received at the original destination terminal to the new destination terminal.

26. The system of claim 25 further including a remote server coupled to the electronic mail server through a backbone network.

27. The system of claim 26 further including means for receiving and transmitting message summaries between the remote server and the communication device, each message summary identifying the original destination terminal coupled to the remote server.

28. The system of claim 25 further including a database coupled to the electronic mail server and means for accessing the database and locating within the database a copy of the received message at the original destination terminal corresponding to the destination terminal identified in the revised message summary.

29. The system of claim 25 further including means for obtaining a copy of the received message at the original destination terminal for re-transmission to the new destination identified in the revised message summary.

30. The system of claim 25 further including means for forwarding the copy of the received message at the original destination to the new destination.

31. In a communication system including an electronic mail server coupled to an electronic mail network and an alert network, a communication device for remotely re-selecting and re-transmitting electronic messages at an original destination terminal to a new destination terminal, a communication device comprising:
a) a transceiver coupled to the alert network for receiving and sending message summaries of received mail at a destination terminal coupled to the server;
b) a memory coupled to the transceiver and a display, the memory storing message summaries;
c) a processor coupled to a keyboard means, the processor responsive to a user through the keyboard for identifying in a selected message summary a new destination for an electronic message received at the original destination and indicated in the selected message summary stored in the memory; and
d) sending means for forming and sending the selected message summary containing the new destination over the alert network to the electronic mail network for instructing the original destination or if not serving the new destination then an alternative destination to re-transmit the received message at the original destination terminal to the new destination terminal inputted to the keyboard by the user.

32. The device of claim 31 wherein the memory supplies such message summaries to the display.

33. The device of claim 31 further including a backbone network wherein the re-transmitted electronic message at the original destination is sent to the new destination terminal through the backbone network.

34. The device of claim 31 further including a remote server and means for receiving and transmitting message summaries between the remote server and the communication device, each message summary identifying the original destination terminal coupled to the remote server.

35. The device of claim 31 further including means for scrolling the message summaries stored in the memory and shown in the display.

36. The device of claim 31 further including means for selecting a message summary in the display and designating a new destination in the message summary.

37. The device of claim 33 further including a keypad for inputting the new destination to the selected message summary.

38. The device of claim 32 further including means for forming a revised message summary in an output buffer for transmission to the server.

39. The device of claim 38 further including means for sending the revised message summary in the output buffer to the server.

* * * * *